United States Patent [19]

Atchekzai et al.

[11] Patent Number: 5,075,405

[45] Date of Patent: Dec. 24, 1991

[54] MIXTURES OF REACTIVE THERMOSETTING RESINS WHICH ARE STABLE AT AMBIENT TEMPERATURE, LATENT CATALYST COMPLEXES FOR HARDENING SAID MIXTURES, PROCESSES FOR THEIR MANUFACTURE, AND HEAT-HARDENED RESINS OBTAINED FROM SAID MIXTURES

[75] Inventors: Jean Atchekzai; Bernard Bonnetot, both of Villeurbanne; Bernard Frange, Lyons; Henri Mongeot, Villeurbanne; Alain Anton, Chaponnay; Alain Dubuisson, Le Garel, all of France

[73] Assignee: GEC Alsthom, SA, Paris, France

[21] Appl. No.: 406,543

[22] Filed: Sep. 13, 1989

[30] Foreign Application Priority Data

Sep. 16, 1988 [FR] France ................... 88 12114

[51] Int. Cl.$^5$ ............................. C08G 18/58
[52] U.S. Cl. ......................... 528/52; 528/53; 528/55
[58] Field of Search ............... 528/52, 53, 55

[56] References Cited

U.S. PATENT DOCUMENTS

| | | | |
|---|---|---|---|
| 4,631,306 | 12/1986 | Markert et al. | 523/457 |
| 4,636,556 | 1/1987 | Ihlein et al. | 528/53 |
| 4,680,222 | 7/1987 | Anton | 428/251 |
| 4,755,580 | 7/1988 | Saunders et al. | 528/91 |

OTHER PUBLICATIONS

Karasawa et al., "Thermosetting Resin Compounds," Chemical Abstracts, vol. 90, No. 22, May 1979, p. 52, No. 169687y.

Primary Examiner—Maurice J. Welsh
Assistant Examiner—Rachel Johnson
Attorney, Agent, or Firm—Kenyon & Kenyon

[57] ABSTRACT

Mixtures of reactive thermosetting resins which are stable at ambient temperature, latent catalyst complexes for hardening said mixtures, processes for their manufacture, and heat-hardened resins obtained from said mixtures. Mixtures of heat-reactive thermosetting resins which are stable at ambient temperature for use in impregnating insulation for electrical materials or in the preparation of molding products or composite materials, comprising liquid oligo- or poly-isocyanate compounds and liquid epoxy resins and a latent hardening catalyst which is inert at ambient temperature and is composed of an addition complex of an amine compound from the group consisting of the amines, the alkylhydrazines and the imidazoles, and a boron halide. They additionally comprise a small quantity of maleic anhydride or the boron halide is boron tribromide with no addition of maleic anhydride. Latent catalyst complexes of these mixtures, formed by the addition complexes of $BBr_3$ and an amine, an alkylhydrazine or an imidazole. Their manufacturing processes and the resins obtained from said mixtures.

9 Claims, 5 Drawing Sheets

MIXTURES OF REACTIVE THERMOSETTING RESINS WHICH ARE STABLE AT AMBIENT TEMPERATURE, LATENT CATALYST COMPLEXES FOR HARDENING SAID MIXTURES, PROCESSES FOR THEIR MANUFACTURE, AND HEAT-HARDENED RESINS OBTAINED FROM SAID MIXTURES

This invention relates to mixtures of heat-reactive thermosetting resins which are stable at ambient temperature and are employed to impregnate insulation for electrical materials or to prepare molding products or composite materials, comprising liquid oligo- or poly-isocyanate compounds and liquid epoxy resins and a latent hardening catalyst which is inert at ambient temperature and is composed of an addition complex of an amine compound from the group consisting of the amines, the alkylhydrazines and the imidazoles, and a boron halide.

It also applies to latent hardening catalysts of these mixtures based on complex compounds of boron trihalides and an amine compound from the group consisting of the amines, the alkylhydrazines and the imidazoles, to processes of preparing these complex compounds and to the heat-hardened resins obtained from these mixtures.

There have been proposed, in documents FR-A-2373129 and EP-A-0129787, mixtures of thermosetting resins employed to impregnate insulation for electric machines and to prepare products for use in molding, based on polyisocyanate compounds and liquid epoxy resins, displaying a viscosity which increases at a very slow rate at ambient temperature and which harden rapidly at higher temperatures, and comprising a latent hardening catalyst consisting of an addition complex of tertiary amines and boron trifluoride or trichloride.

It is known that when these resins are heated, they are transformed by polycondensation into isocyanurate-oxazolidone resins displaying good properties for use as resins for impregnating insulation for electric machines or for molding products. However, such mixtures do not retain their stability at ambient temperature over prolonged periods, and the mechanical properties of the resins produced by heat-hardening, particularly their bending strength and impact strength, are inadequate for certain applications.

The object of this invention is to produce mixtures of reactive thermosetting resins based on liquid oligo- or poly-isocyanate compounds and liquid epoxy resins displaying improved stability when cool, wherein these are transformed by heating into hardened resins having improved mechanical properties.

The mixtures according to the invention are characterized in that they additionally comprise a small quantity of maleic anhydride, or in that the boron halide is boron tribromide with no addition of maleic anhydride. However, complex compounds of boron tribromide with the addition of maleic anhydride display superior performance, both with respect to their stability when cool and to the mechanical properties of the hardened resins obtained by heating.

Preferably, they also display at least one of the following characteristics:

The amine compound of the complex compound is octyldimethylamine or benzyldimethylamine.

The amine compound of the complex compound is dimethylhydrazine.

They contain from 0.1 weight percent to 15 weight percent of an addition complex of an amine compound and of boron halide.

The amine compound is octyldimethylamine or benzyldimethylamine, and they contain from 0.1 weight percent to 5 weight percent of addition complex.

They contain from 0.05 weight percent to 5 weight percent of maleic anhydride.

The amine compound is octyldimethylamine or benzyldimethylamine, and they contain from 0.05 weight percent to 1 weight percent of maleic anhydride.

The relative proportions of polyisocyanate compounds to epoxy resins are such that the mole fraction of epoxy/isocyanate is approximately 0.1 to 1.

The invention further relates to the latent catalysts for hardening the mixtures of liquid oligo- or polyisocyanate compounds and liquid epoxy resins, composed of the addition complexes of boron tribromide and an amine compound from the group consisting of the amines, the alkylhydrazines and the imidazoles.

It further applies to a manufacturing process of said complex compounds, wherein a reaction is produced in a dry atmosphere in an anhydrous solvent, at low temperature, of boron tribromide and an amine compound from the group consisting of the amines, the alkylhydrazines and the imidazoles, in substantially stoichiometric proportions, under vigorous agitation.

Preferably, the resulting complex compounds are then filtered by selective chromatography.

It also applies to the latent hardening catalysts for mixtures of liquid oligo- or polyisocyanate compounds and liquid epoxy resins, comprising a complex compound as defined in the foregoing with the addition of a small amount of maleic anhydride.

Finally, it relates to the isocyanurateoxazolidone resins obtained by heating the mixtures described above.

Among the amines that are particularly well suited for producing complex compounds with a boron trihalide, in addition to octyldimethylamine and benzyldimethylamine, the following may be cited: N,N-dimethylamine, pyridine, triethylamine, trimethylamine, N,N,N',N', tetramethyl-1,4-butane-diamine, triisooctylamine and piperidine.

In general, the mixtures according to the invention display improved stability at ambient temperature and produce heat-hardened resins having improved mechanical properties relative to those comprising latent catalysts composed of mixtures of boron trichloride or trifluoride and an amine compound, such as a tertiary amine or an imidazole.

The following examples provided for purposes of illustration and referring to the figures in the appended drawing describe the preparation of a complex compound of boron tribromide and a tertiary amine, of mixtures which are stable at ambient temperature and consist of liquid oligo- or poly-isocyanate compounds and liquid epoxy resins, and a latent hardening catalyst, as well as the properties of such mixtures and the mechanical properties of the isocyanurate-oxazolidone resins produced by heating said mixtures.

EXAMPLE 1

Preparation of a complex compound of boron tribromide and a tertiary amine

Boron tribromide and a tertiary amine are dissolved in an anhydrous solvent such as hexane, in a dry atmosphere and at low temperature (0° C.), as the reaction is isothermal.

Substantially stoichiometric proportions are used, preferably with a very slight excess of boron tribromide, and the mixture is vigorously agitated. The product is filtered by selective chromatography to remove impurities. Purity levels may be determined by nuclear magnetic resonance (NMR) spectra of the proton. The nature of the complex compound may be determined using conventional analytic methods such as infrared or NMR spectra of the boron.

EXAMPLE 2

Mixtures of liquid compounds which are stable when cool

Liquid oligo- or poly-isocyanate compounds and liquid epoxy resins are measured in quantities such that, respectively, the mole fraction of epoxy groups/isocyanate groups is equal to 0.25, or:

20 parts by weight of polyisocyanates with a base of methylene diisocyanate (molecular weight 270);

20 parts by weight of diamine diisocyanate isophorone (molecular weight 198);

20 parts by weight of polyexpoxide obtained from A bisphenol glycidoldiether (molecular weight 348);

0.15 weight percent to 0.30 weight percent, relative to the total weight of oligomers and polymers, of a complex compound of boron obtained from boron tribromide or trichloride and octyldimethylamine (hereinafter designated by the abbreviation ODMA);

optionally, 0.075 weight percent, relative to total weight of oligomers and polymers, of maleic anhydride.

The initial viscosity of such a mixture as measured at 20° C. is less than 200 millipascals.sec (mPa.s).

The following were recorded:

time t (in days) required to double viscosity at a constant temperature of 35° C.;

viscosity $\eta$ 20° C. in mPa.s after 10 days at 35° C.;

hardening time tg (in minutes, for 15 g of mixture at 135° C.).

The results are summarized in Table I below and in FIG. 1 of the drawing.

BRIEF DESCRIPTION OF DRAWINGS

The figures show viscosity versus time curves and differential thermal analysis curves for different catalyst systems.

TABLE I

| Nature of complex | $BBr_3$, ODMA | $BBr_3$, ODMA + Maleic Anhydride | $BCl_3$, ODMA | $BCl_3$, ODMA + Maleic Anhydride |
| --- | --- | --- | --- | --- |
| t | 3 | >60 | 1 | >60 |
| $\eta$ | 2000 | 160 | 15,000 | 160 |
| tg | 15 | 20 | 9 | 15 |

Figure 1:
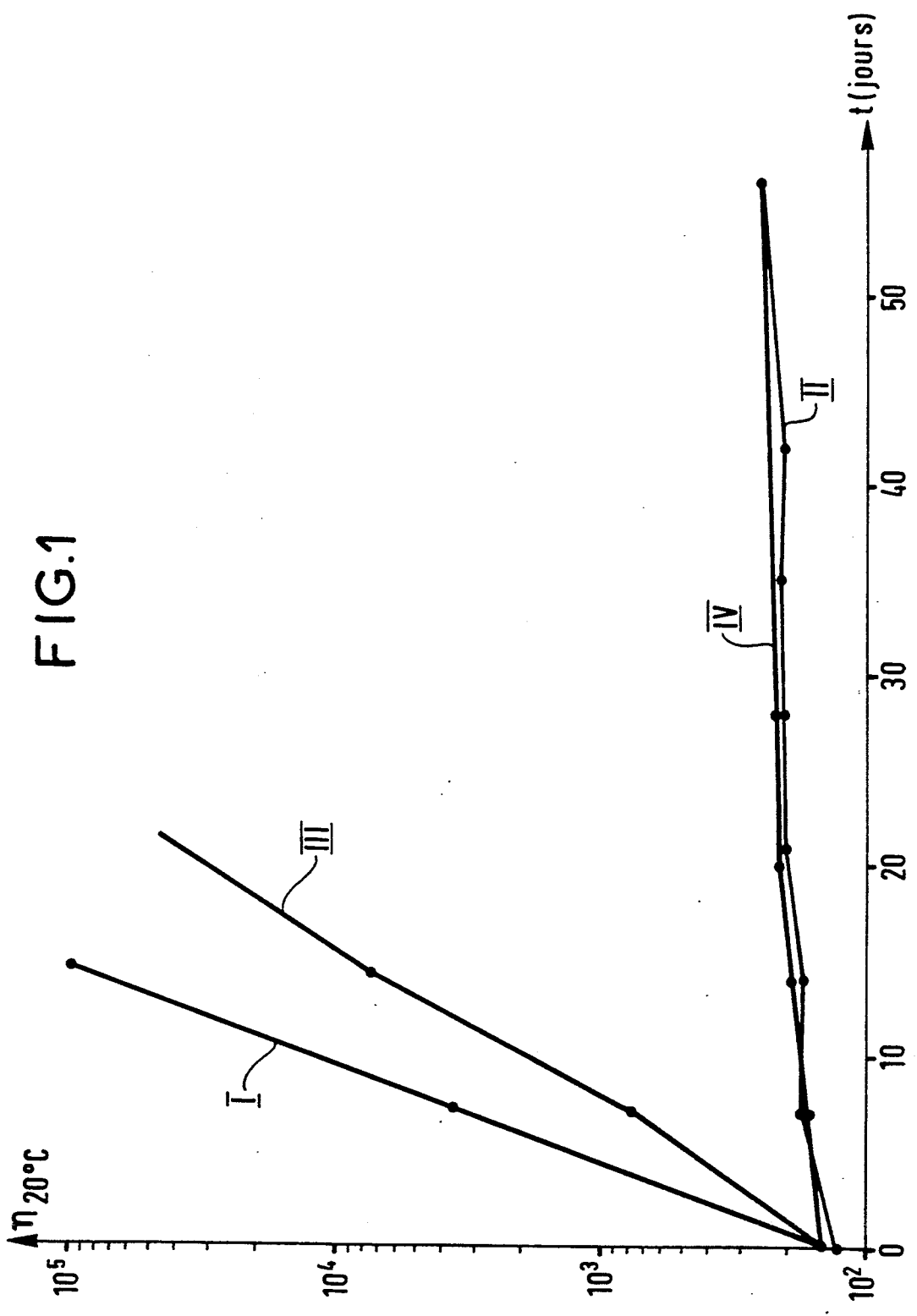
FIG. 1 compares viscosity vs. time curves for resins polymerized with four different catalysts.

FIG. 1 shows the change in viscosity $\eta$ of the mixture at 20° C. as a function of curing time t (in days) at a temperature of 35° C. for the mixtures of $BCl_3$-ODMA (curve I), $BCl_3$-ODMA + maleic anhydride (curve 2), $BBr_3$ - ODMA (curve III) and $BBr_3$-ODMA + maleic anhydride (curve IV). It was observed that the increase in viscosity of the $BB_3$-ODMA mixture was lower relative to that of the $BCl_3$-ODMA mixture, and that the viscosity of the complex compounds with added maleic anhydride increased very little.

Using the same mixtures, test samples were prepared by heating for a period of 4 hours at 120° C., followed by 2 hours at 150° C., followed by 15 hours at 200° C. These polymers were characterized by dynamic torsion analysis (using Rheometrics RDS Series II equipment).

In each case, two vitreous transition zones were observed.

The temperature differential between the two zones at the peaks was approximately 60° C. for the $BCl_3$-ODMA mixtures with no maleic anhydride and approximately 90° C. for the $BBr_3$-ODMA mixtures with no maleic anhydride.

The first vitreous transition zone is predominant. This translates into a high value for the variable tg $\delta$, corresponding to a damping of the material extending over a broad temperature range.

Table II below shows the vitreous transition temperatures (in degrees Celsius) recorded at the peak values of tg $\delta$.

TABLE II

| Nature of Complex | $BBr_3$, ODMA | $BBr_3$, ODMA + Maleic Anhydride | $BCl_3$, ODMA | $BCl_3$, ODMA + Maleic Anhydride |
| --- | --- | --- | --- | --- |
| $TV_1$ | 257° | 272° | 274° | 278° |
| $TV_2$ | 333° | 329° | 335° | 332° |

Measurements were made to determine the bending strength and impact strength of the heat-hardened resins produced by using the same mixtures and applying the heating process described in the foregoing. The results showed a 25% increase in bending strength for the $BBr_3$-ODMA + maleic anhydride catalyst and greater deflection at the fracture point for the same modulus. Impact strength also increased more than 50%. The results are summarized in Table III below.

TABLE III

| Nature of Complex | $BBr_3$, ODMA | $BBr_3$, ODMA + Maleic Anhydride | $BCl_3$, ODMA | $BCl_3$, ODMA + Maleic Anhydride |
| --- | --- | --- | --- | --- |
| Fracture strength under bending (MPa) | 71 | 87 | 68 | 72 |
| Section modulus (MPa) | 3,130 | 3,160 | 3,150 | 3,170 |
| Deflection at fracture point (mm) | 3.9 | 4.7 | 3.6 | 3.9 |
| Fracture strength under bending at 220° C. (MPa) | | 67 | | 68 |
| Impact strength (kj/m²) | 5.5 | 10.4 | 6.1 | 6.8 |

Figure 2:
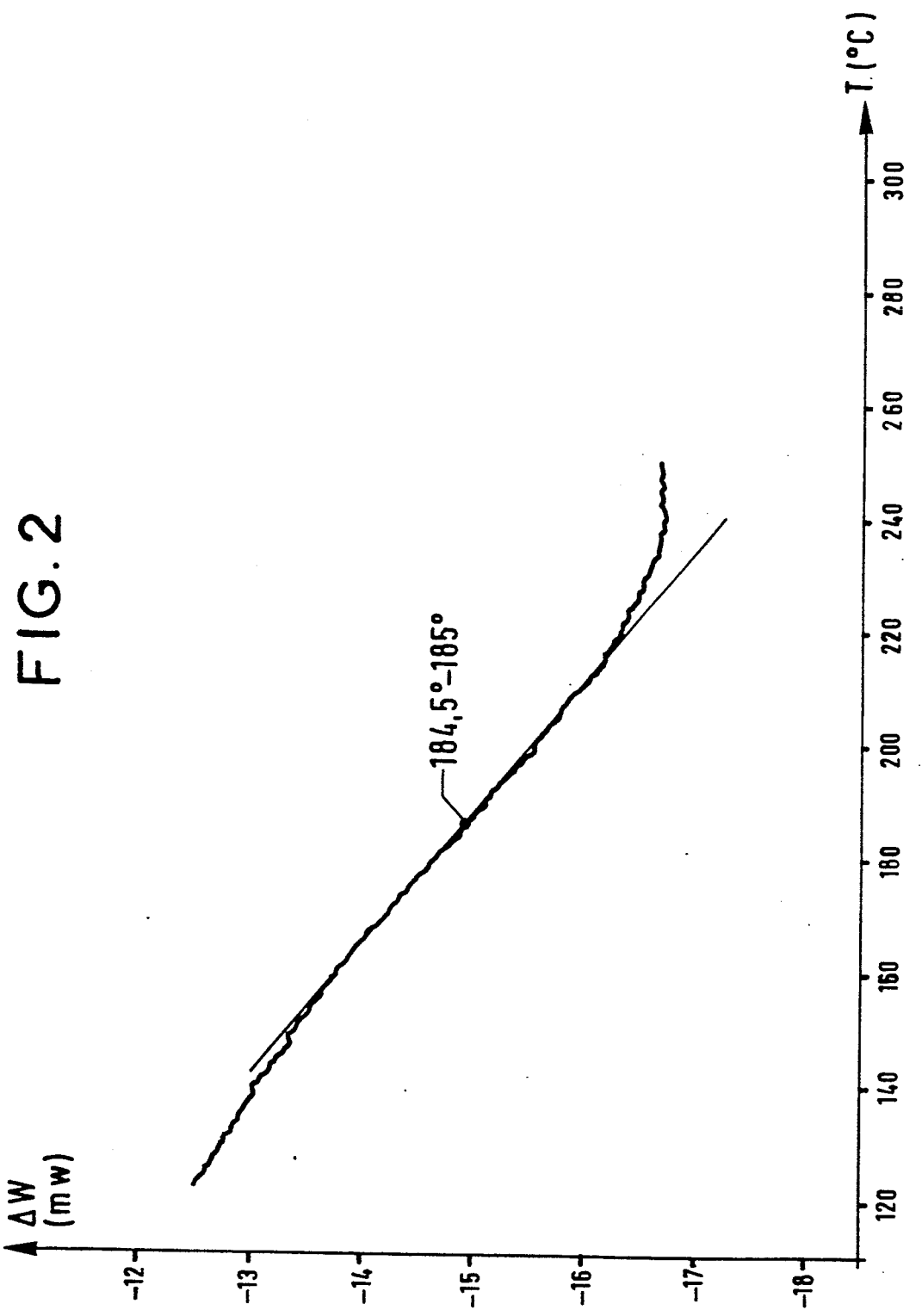
FIGS. 2 and 3 show differential thermal analysis curves for resins made using two different catalysts.
Figure 3:
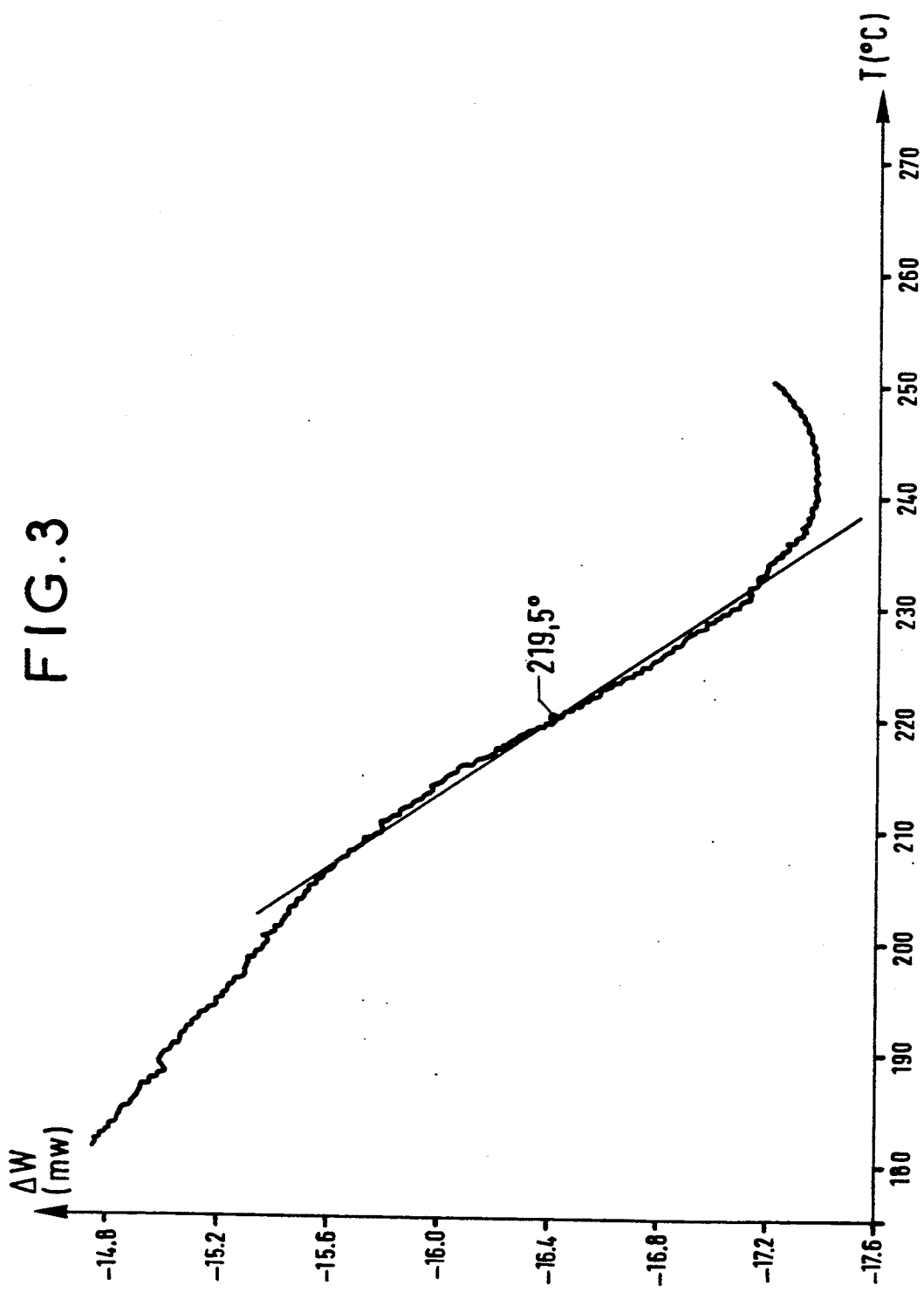

An attempt was made to measure vitreous transition temperatures according to a conventional thermal differential analysis technique using a DUPONT 1090 machine. However, this equipment does not have the sensitivity required to detect the two vitreous transition zones. The thermal differential analysis curves for the hardened resins (thermal flux $\Delta W$ in milliwatts as a function of temperature T in degrees Celsius) are shown in FIG. 2 and FIG. 3 for resins with the latent catalysts $BB_3$-ODMA+maleic anhydride and $BCl_3$-ODMA+maleic anhydride, respectively. It is observed that there is a reduction of the vitreous transition temperature for the first latent catalyst (185° C.) relative to the temperature recorded for the second latent catalyst (220° C.). This is due to the less exothermic character of the reaction in the case of boron tribromide. This may account for the mechanical characteristics of the final polymerized products and leads to the assumption that the complex compounds having a boron tribromide base do not react in the same way as those having a boron trichloride base.

Figure 4:
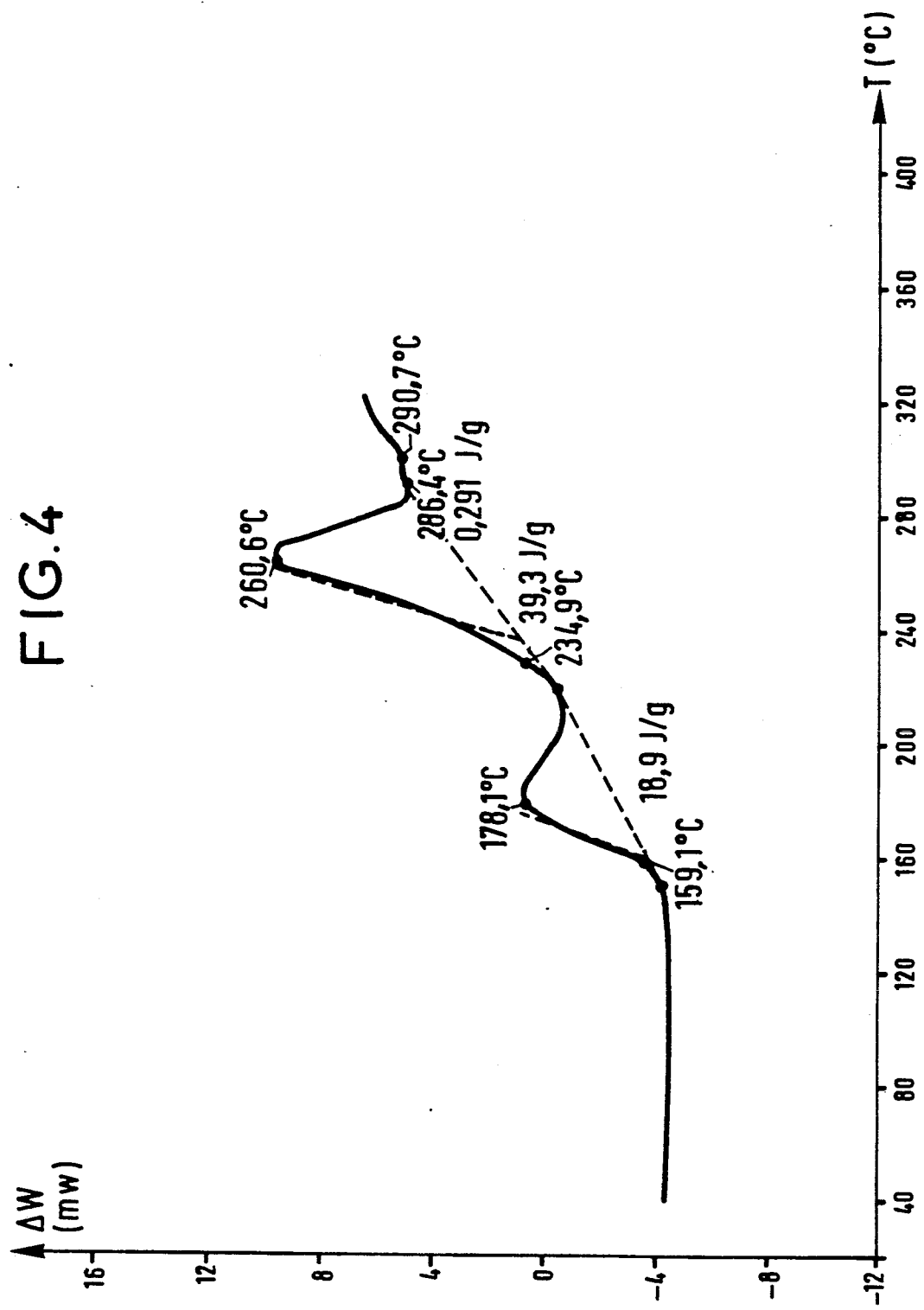
FIGS. 4 and 5 show differential thermal analysis curves made during the polymerization with two different catalysts.
Figure 5:
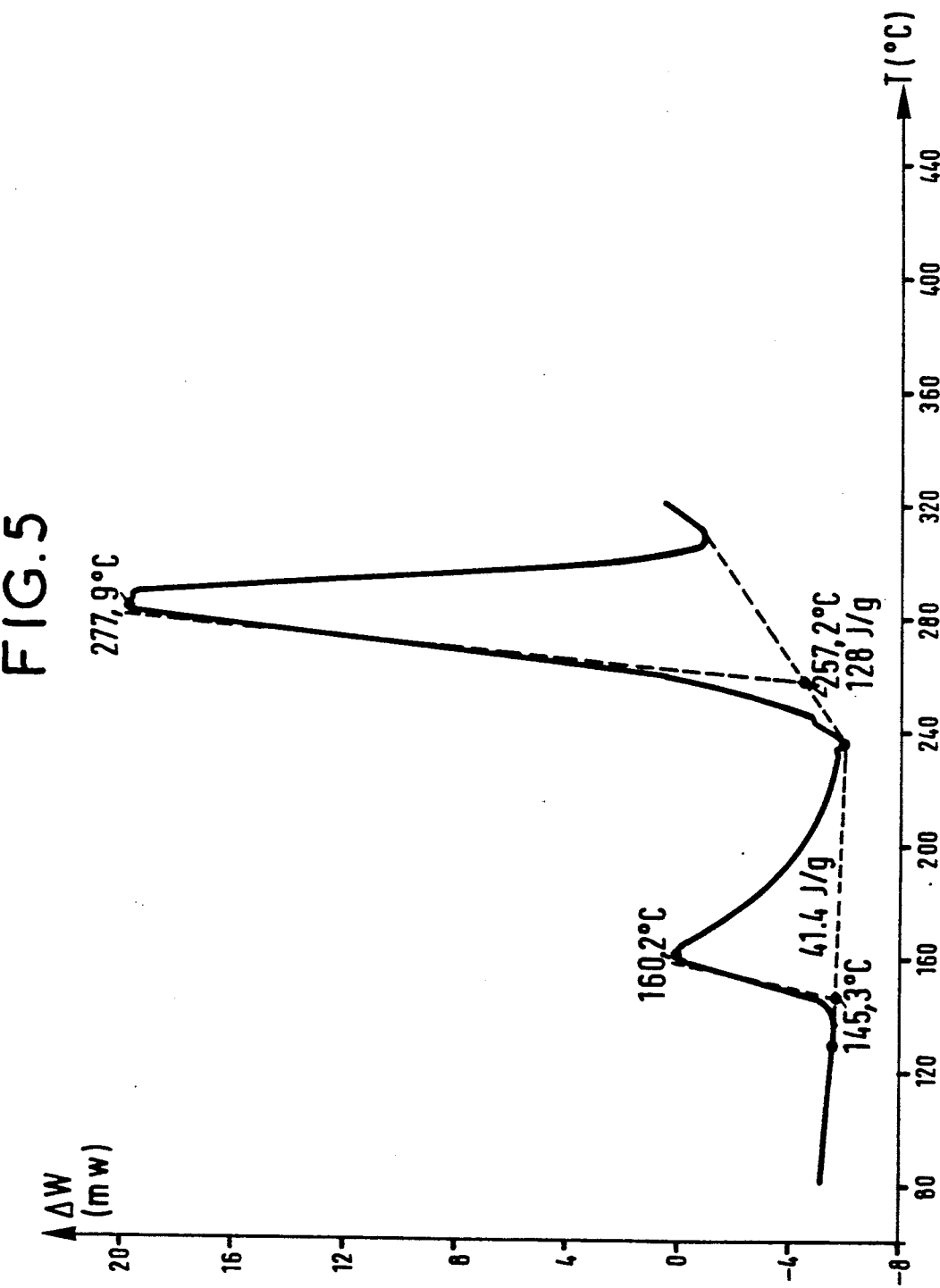

Thermal analysis measurements (thermal flux $\Delta W$ in milliwatts as a function of temperature T in degrees Celsius) were also made during the polymerization reaction on mixtures (varnishes) containing as their latent catalysts the complex compound $BBr_3$-ODMA with added maleic anhydride (FIG. 4) on the one part, and the complex compound $BCl_3$-ODMA with added maleic anhydride (FIG. 5) on the other part. It was observed that the catalyst with the boron tribromide base produced a less exothermic reaction. This facilitates the production of parts having large dimensions.

The mixtures of liquid oligo- or poly-isocyanate compounds and liquid epoxy resins with the addition of the latent catalysts described in the foregoing may be employed as varnishes to impregnate insulation for electric machines or to produce molded parts displaying excellent mechanical properties or to produce composite materials.

We claim:

1. A mixture of heat-reactive thermosetting resins which is stable at ambient temperature for use in impregnating insulation for electrical materials and in the preparation of molding products and composite materials, the mixture comprising:

liquid compounds selected form the group consisting of olio-isocyanate and poly-isocyante compounds;

at least one liquid epoxy resin; and a latent hardening catalyst which is inert at ambient temperature and is composed of an addition complex of a boron halide and an amine compound selected from the group consisting of the amines, the alkyl-hydrazines, and the imidazoles, wherein the boron halide is selected from the group consisting of boron tribromide alone and any other boron halide mixed with a small quantity of maleic anydride.

2. A mixture as claimed in claim 1, wherein the amine compound of the addition complex is selected from the group consisting of octyldimethylamine and benzyldimethylamine.

3. A mixture as claimed in claim 1, wherein the amine compound of the addition complex is dimethylhydrazine.

4. A mixture as claimed in claim 1, wherein said mixture contains from 0.1 weight percent to 15 weight percent of said addition complex of an amine compound and a boron halide.

5. A mixture as claimed in claim 4, wherein the amine compound is selected from the group consisting of octyldimethyamine and benzyldimethylamine, and wherein said mixture contains from 0.1 weight percent to 5 weight percent of said addition complex.

6. A mixture as claimed in claim 1, wherein said mixture contains from 0.05 weight percent to 5 weight percent of maleic anhydride.

7. A mixture as claimed in claim 6, wherein the amine compound is selected from the group consisting of octyldimethyamine and benzyldimethylamine, and wherein said mixture contains from 0.05 weight percent to 5 weight percent of maleic anhydride.

8. A mixture as claimed in claim 7, wherein the relative proportion of liquid isocyanate compounds to epoxy resins is such that the mole fraction of epoxy/isocyanate is in the range of approximately 0.1 to 1.

9. A mixture as claimed in claim 5, wherein the relative proportion of liquid isocyanate compounds to epoxy resins is such that the mole fraction of epoxy/isocyanate is in the range of approximately 0.1 to 1.

* * * * *

UNITED STATES PATENT AND TRADEMARK OFFICE
CERTIFICATE OF CORRECTION

PATENT NO. : 5,075,405

DATED : December 24, 1991

INVENTOR(S) : JOAN ATCHEKZAI et al.

It is certified that error appears in the above-identified patent and that said Letters Patent is hereby corrected as shown below:

Col. 5, line 42: "form" should be --from--.

Col. 5, line 43: "olio" should be --oligo--.

Signed and Sealed this

Sixth Day of April, 1993

Attest:

STEPHEN G. KUNIN

*Attesting Officer*     Acting Commissioner of Patents and Trademarks